April 10, 1951

R. J. ASKEVOLD 2,548,763

METHOD OF DETERMINING TEMPERATURE OF
COMPLETE MISCIBILITY OF LIQUIDS

Filed June 11, 1945

2 Sheets-Sheet 2

INVENTOR
Robert J. Askevold
BY
Edward H. Lang
ATTORNEY

Patented Apr. 10, 1951

2,548,763

UNITED STATES PATENT OFFICE 2,548,763

METHOD OF DETERMINING TEMPERATURE OF COMPLETE MISCIBILITY OF LIQUIDS

Robert J. Askevold, Skokie, Ill., assignor to The Pure Oil Company, Chicago, Ill., a corporation of Ohio Application June 11, 1945, Serial No. 598,703

9 Claims. (Cl. 73—53)

This invention is directed to a method for determining the temperature of complete miscibility of a solute in a solvent and is more particularly directed to a method for determining the aniline point of hydrocarbon oils.

The method for determining aniline point of petroleum products, A. S. T. M. designation D611–44T published on pages 55–57 of A. S. T. M. Standards on Petroleum Products and Lubricants, October 1944, is not satisfactory in connection with dark colored oils.

I have discovered a method for determining aniline point and temperature of complete miscibility of solutes in solvents in general which does not depend on visual observation, but depends on electrometric or conductivity measurement. I have discovered that at the temperature of complete miscibility, a sudden change in conductivity of the solution occurs, the solution exhibits maximum conductivity, or the solution exhibits minimum conductivity, which can be measured in terms of voltage across a bridge circuit, the electrodes of which are immersed in the solution of the substance whose temperature of complete miscibility or aniline point it is desired to determine and that the voltage can be readily measured by means of a millivoltmeter of the vacuum tube type.

Figure 1:
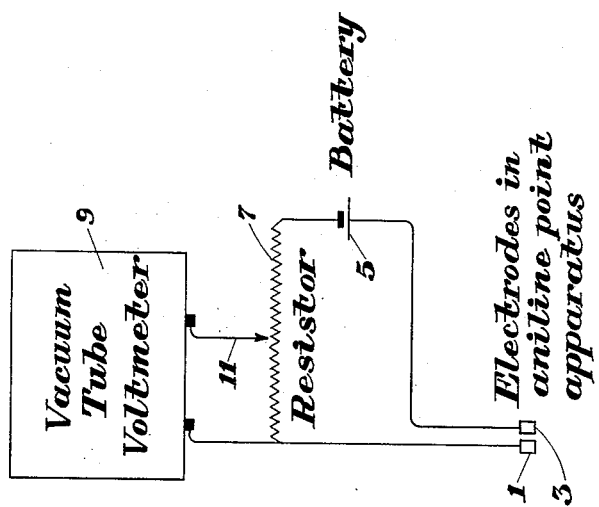
Figure 2:
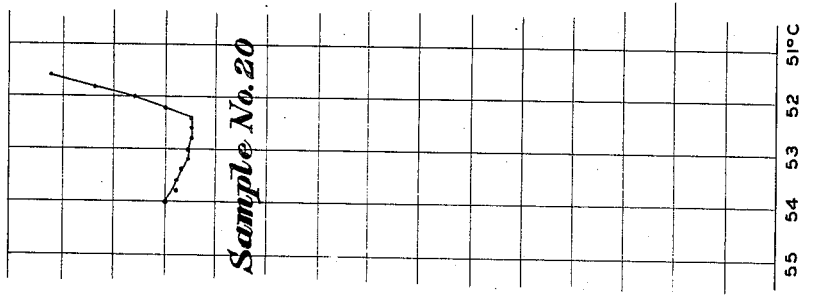
Figure 2:
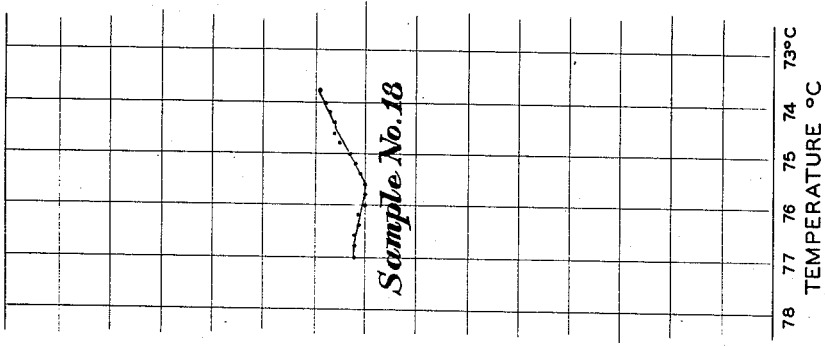
Figure 2:
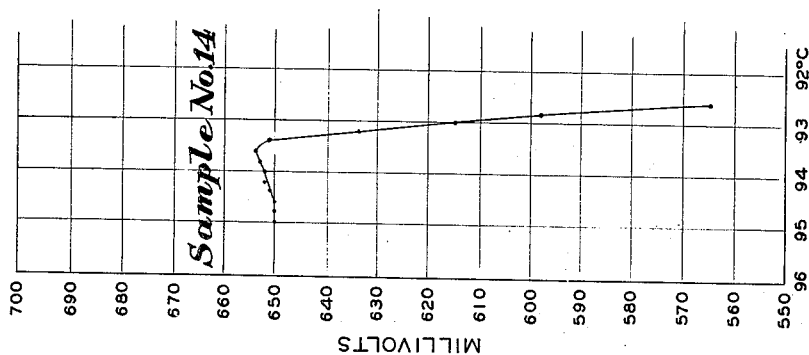

Figure 1 is a diagrammatic illustration of a bridge circuit for use in accordance with my invention, and Figure 2 is a graph containing curves representing measurements made in the determination of aniline point of several different oils.

In accordance with my invention where aniline point is to be determined, standard aniline point apparatus, shown and described in the aforesaid A. S. T. M. Standard publication, is used in conjunction with the bridge circuit shown in Figure 1. The bridge circuit consists of two electrodes 1 and 3 which are adapted to be immersed in the test tube or other receptacle in which aniline point or temperature of complete miscibility is being determined. The electrodes may be composed of any conductive material which is not corroded by the materials to be tested. Examples of materials which may be used may be mentioned, platinum, gold, silver and carbon. Although I prefer to have two electrodes of similar material, they may be composed of dissimilar material.

A battery 5 or other source of direct current is connected in the circuit in series with a resistor 7. A vacuum tube voltmeter 9, such as a Leeds & Northrup Universal pH meter, is connected across the resistor 7 by means of the variable contact 11. Spaced electrodes 1 and 3 are inserted through the stopper of the test tube in which the determination is made and are insulated therefrom. Care should be exercised that the electrodes do not touch a conducting surface. It is preferred to have the electrodes as close as possible to the point of temperature measurement in order to eliminate possibility of error due to temperature gradient.

By observing the conductivity of the solution at a series of temperatures in a range including temperature of complete miscibility, this temperature can be determined with as high a degree of precision as the situation requires. For most careful work it is merely necessary to plot temperature versus conductivity and to measure the slope of the curve, taking the point at which the slope passes through zero as the complete miscibility temperature. Alternative procedure would be to prepare a derivative of the conductivity-temperature plot and observe the temperature at which that plot passes through zero. In the specific embodiment of the process described in the specification, the property which is to be measured, and in which the operator has greatest interest, is only the temperature characterized as the aniline point of a hydrocarbon fluid. Accordingly, the preparation of temperature-conductivity plots will not usually be carried out, but the same determination will be made simply by observing the indication of the voltmeter used to observe the potential across the conductivity cell in the circuit.

In making the aniline point determination or determining the critical solution temperature of other substances, the mixture of oil and aniline is heated slowly until a sudden change in conductivity is noted. This will usually occur several degrees below the point of complete miscibility, thus giving a rough indication of the aniline point. The solution is heated above the aniline point and slowly cooled. Conductivity as indicated by the voltage readings on the vacuum tube voltmeter are recorded at approximately every 0.2 degree drop in temperature. The change in conductivity will be small, if any, until the aniline point is reached, when a sudden rise or fall in conductivity of the solution, as indicated by the voltmeter reading, occurs. The aniline point is the temperature where rapid change in conductivity begins during slow cooling of the mixture, or the maximum or minimum point on a plot of temperature vs. conductivity. In some cases a rapid change in conductivity does not occur but when a curve is plotted with temperature as ordinates and conductivity as abscissae, or vice versa, there will be either a minimum or a maximum point of conductivity on the curve. The temperature at which this point occurs is the aniline point or the temperature of complete miscibility.

In order to demonstrate the effectiveness of my method of determining aniline point, a number of tests were made on various samples of oils listed in the following table with the results obtained:

Table

| Sample No. | Designation of Sample | Average Aniline Point, °C. | | |
|---|---|---|---|---|
| | | A. S. T. M. | SIL U-Tube | Electrometric |
| 1 | n-Heptane | 69.2 | 69.4 | 69.2 |
| 2 | Straight-run naphtha | 56.0 | | 56.1 |
| 3 | 300° F. end-point straight-run gasoline | 53.8 | | 54.0 |
| 4 | 100° F. I. B. P. to 400° F. E. P. cracked gasoline | 28.2 | | 28.3 |
| 5 | Ethyl mixed straight-run and cracked gasoline | 40.2 | | 40.2 |
| 6 | Stoddard solvent | 56.4 | | 56.4 |
| 7 | 400° F. I. B. P. to 500° F. Kerosene distillate | 64.4 | | 64.5 |
| 8 | Kerosene | 70.6 | | 70.6 |
| 9 | Thermofor Residue boiling above 400° F. (Dark Color) | [1] 61.3 | | 61.0 |
| 10 | 500° F. I. B. P. to 600° F. E. P. gas oil | 73.6 | | 73.5 |
| 11 | 600° F. I. B. P. to 700° F. E. P. gas oil | 79.8 | | 79.7 |
| 12 | Pennsylvania gas oil | 84.6 | | 84.6 |
| 13 | No. 2 furnace oil | 60.1 | | 60.2 |
| 14 | 200 Vis. at 100° F. Mid-Continent Neutral | 93.5 | | 93.5 |
| 15 | Mid-Continent Bright Stock | 114.9 | | 115.0 |
| 16 | Navy fuel oil (Dark Oil) | | | 72.9 |
| 17 | Dark Oil, ASTM S-72 | | 95.0 | 94.5 |
| 18 | Dark Oil, ASTM S-73 | | | 75.6 |
| 19 | Dark Oil, SIL #15593 | | 125.9 | 126.1 |
| 20 | Dark Oil, SIL #15594 | | 52.3 | 52.3 |
| 21 | Dark Oil, Shell S-40 | | | 41.8 |
| 22 | Dark Oil, Shell S-41 | | | 49.9 |

[1] Approx.

The figures given under the heading "A. S. T. M." are those obtained by the Standard A. S. T. M. Method designated D611—44T. The figures given under the heading "SIL U-Tube" are obtained by the Standard Inspection Laboratory Method published at page 63, of the Industrial and Engineering Chemistry, Analytical edition, volume 14, 1942. The figures under the heading "Electrometric" are aniline points determined by the invention herein described. It will be observed from a comparison of the aniline points determined by the A. S. T. M. method and by the electrometric method herein described that they check very closely.

Figure 2 shows the readings which were taken during individual runs. The aniline point as shown in these curves does not agree exactly with the aniline point in the table for the reason that the figures in the table are averages of a number of runs on each sample. From two to twenty-three runs were made on each sample and the averages of the runs are the figures used in the table. The readings in Figure 2 are based on single runs made on the particular sample.

Although the invention has been described particularly with reference to the determination of the aniline point of petroleum products, it is to be understood that the method is applicable to the determination of the temperature of complete miscibility of any solute in a solvent as for example, solution of a fatty oil in a solvent such as ethylene dichloride.

In addition to being useful for determining the temperature of complete miscibility of a solute in a solvent, the method is useful in continuous processes for determining the point in the flow where critical solution occurs. For example, if a mixture of a solute and a solvent were flowing through a coil, it would be possible to determine at what point in the coil complete solution took place by measuring the potential at various points along the coil. In order to do this, it would be necessary to provide means for inserting the electrodes at various points in the coil.

The invention is not limited to the use of the bridge circuit shown and described. Other types of bridge circuits can be used.

Although I have found that aniline point or temperature of complete miscibility can more readily be determined by slowly cooling the solution from a temperature above to a temperature below the aniline point or temperature of complete miscibility, the same determinations can be made by slowly raising the temperature from below to above the aniline point or temperature of complete miscibility.

In carrying out measurements of aniline point or temperature of complete miscibility, I may use alternating current of any frequency in place of the direct current source described in the example, together with an appropriate alternating current vacuum tube volt meter to determine the conductivity of a particular solution.

It will be seen, therefore, that I have discovered a novel method for readily determining aniline points and the temperature of complete miscibility of a solute in a solvent regardless of the color or opacity of the mixture or solution.

It is claimed.

1. The method of determining the aniline point of a mineral oil product comprising mixing the product with aniline in accordance with A. S. T. M. procedure D611—44T, slowly cooling the solution from a temperature above the aniline point of the product and measuring the temperature at which the electrical conductivity of the solution suddenly changes.

2. The method of determining the temperature of complete miscibility of one organic liquid in another comprising measuring the change in electrical conductivity of the liquids over a range of temperature extending above and below the temperature of complete miscibility and determining the temperature at which a rapid change in electrical conductivity occurs indicated by a point of maximum conductivity, or a point of minimum conductivity.

3. The method of determining the temperature of complete miscibility of a mixture of liquids which are not miscible in all proportions at all temperatures comprising, adjusting the temperature of a solution of the solute in the solvent toward the temperature of complete miscibility, coupling said solution with an electrical measuring circuit, and measuring the variation of electrical conductivity of the solution with temperature until a sudden alteration in the rate of change of said conductivity with temperature occurs.

4. The method of determining the aniline point of a mineral oil product comprising, mixing the product with aniline in accordance with A. S. T. M. procedure D611—44T, slowly warming the solution from a temperature below the aniline point of the product, and measuring the temperature at which the electrical conductivity of the solution suddenly changes.

5. The method of determining the aniline point of a mineral oil comprising, mixing the oil with aniline in accordance with A. S. T. M. procedure D611—44T, altering the temperature of the mixture of oil and aniline to take it through the critical solution temperature thereof, and determining the temperature at which the rate of change of conductivity of said mixture with temperature passes through zero.

6. The method of determining the temperature of complete miscibility of two liquids which are not miscible with each other in all proportions at all temperatures comprising, adjusting the temperature of the mixture toward the temperature of complete miscibility, connecting said solution with an electrical measuring circuit and measuring the variation of electrical conductivity of the mixture with change in temperature and determining a point in the conductivity temperature relationship where the change of electrical conductivity is greatest.

7. The method of determining the temperature of complete miscibility of an oil in an organic solvent comprising, adjusting the temperature of the mixture toward the temperature of complete miscibility, connecting said solution with an electrical measuring circuit, measuring the variation of electrical conductivity of the solution with change in temperature and determining the temperature where change in electrical conductivity is greatest.

8. The method in accordance with claim 7 in which the solute is a fatty oil.

9. The method of determining the temperature of complete miscibility of aniline and mineral oil comprising mixing the oil and aniline, altering the temperature of the mixture of oil and aniline to take it through the temperature of complete miscibility and determining the temperature at which an abrupt change in electrical conductivity of said mixture with change in temperature occurs as indicated by maximum or minimum electrical conductivity.

ROBERT J. ASKEVOLD.

REFERENCES CITED

The following references are of record in the file of this patent:

UNITED STATES PATENTS

| Number | Name | Date |
| --- | --- | --- |
| 2,349,482 | Welty | May 23, 1944 |

OTHER REFERENCES

J. N. Friend: A Textbook of Physical Chemistry, vol. 2, Charles Griffin & Co. Limited, London, England (1935).

Lucasse and Abrahams: Journal of Physical Chemistry, vol. 37, pp. 511–524, 1933, "The Transition Points of Salt Hydrates in Various Non-Aqueous Solvents."